United States Patent
Ikenouchi et al.

[19]

[11] Patent Number: 5,835,863
[45] Date of Patent: Nov. 10, 1998

[54] WIRELESS TELEPHONE FOR CELLULAR TELEPHONE SYSTEM

[75] Inventors: Takayuki Ikenouchi; Hiroshi Shimizu, both of Tokyo, Japan

[73] Assignee: Oki Electric Industry Co., Ltd., Tokyo, Japan

[21] Appl. No.: 735,559

[22] Filed: Oct. 23, 1996

[30] Foreign Application Priority Data

Oct. 25, 1995 [JP] Japan .................................. 7-277954

[51] Int. Cl.⁶ .................................................. H04M 1/26
[52] U.S. Cl. .......................... 455/567; 455/566; 455/575
[58] Field of Search .................................. 455/550, 566, 455/567, 575, 517, 502, 347, 351; 379/34, 376, 378

[56] References Cited

U.S. PATENT DOCUMENTS

| | | | |
|---|---|---|---|
| 5,404,391 | 4/1995 | Wavroch et al. ........................ | 455/567 |
| 5,537,459 | 7/1996 | Price et al. ................................ | 455/435 |
| 5,638,421 | 6/1997 | Serrano et al. ............................ | 379/34 |
| 5,651,052 | 7/1997 | Serrano .................................... | 455/567 |
| 5,729,589 | 3/1998 | Samson .................................... | 379/34 |

*Primary Examiner*—Andrew M. Dolinar
*Assistant Examiner*—Hieu T. Vo
*Attorney, Agent, or Firm*—Rabin & Champagne, P.C.

[57] ABSTRACT

A wireless telephone set that performs digital communication employs light-emitting diodes for illumination, and for alerting the user to incoming calls. To avoid disruption of carrier signal frequencies, the light-emitting diodes are switched on and off only during idle periods, such as idle time slots in time-division multiple-access communication. If the wireless telephone also has a vibrator for alerting the user to incoming calls, switching of the vibrator is similarly synchronized with the idle time periods, and the light-emitting diodes are preferably disabled while the vibrator is in use.

16 Claims, 4 Drawing Sheets

WIRELESS TELEPHONE FOR CELLULAR TELEPHONE SYSTEM

BACKGROUND OF THE INVENTION

The present invention relates to a wireless telephone set for use in a cellular telephone system, more particularly to the circuits that control the on-off switching of light-emitting diodes and a vibrator in such a wireless telephone set.

Light-emitting diodes (referred to below as LEDs) are used to illuminate the pushbuttons and liquid-crystal display of a wireless telephone set, so that the telephone set can be used in a dark environment, e.g. outdoors at night. When any one of the pushbuttons is pressed, the LEDs are switched on and remain on for a predetermined period. The LEDs also flash on and off in accompaniment with the ringing tone when a call is received, unless LED flashing has been disabled in advance by the user.

The vibrator functions as an alternative means to alert the user to incoming calls. When set to the vibrator mode, upon receiving a call, the telephone set activates the vibrator, instead of the tone ringer, and also flashes the LEDs, unless flashing has been disabled.

Older wireless telephone models were powered by a battery comprising four or five nickel-cadmium (Ni-Cd) cells coupled in series. This battery provided a supply voltage of 4.8 volts or 6.0 volts, enabling a pair of LEDs to be driven in series. The telephone set typically had eighteen LEDs, one for each of twelve pushbuttons and six more for the liquid-crystal display. Each LED draws about ten milliamperes of current, so when eighteen LEDs were driven in nine series-coupled pairs, the total LED current drain was about ninety milliamperes (90 mA).

To achieve lighter weight and more compact size, recent wireless telephone sets are powered by only three Ni-Cd cells, and operate at a supply voltage of only 3.6 volts. At this reduced voltage, each LED must be driven separately, making the total LED current drain about one hundred eighty milliamperes (180 mA). The vibrator draws an additional forty or fifty milliamperes. The large amount of current drawn by the LEDs, the even larger amount drawn when the LEDs and vibrator operate simultaneously, and the large transient current drawn at the instants when the motor in the vibrator is switched on or off can lead to troublesome fluctuations in the voltage output of the battery. Problems occur particularly in digital cellular telephone systems.

In a digital cellular system, the wireless telephone set must generate accurate carrier frequencies for transmitting and receiving in, for example, the nine-hundred-megahertz (900 MHz) band. For this purpose, the telephone set has a frequency synthesizing circuit employing a voltage-controlled oscillator in a phase-locked loop. As a typical example of the synthesizing performance requirements, the synthesized frequency must be controllable with an accuracy of one hundred hertz or better over a range of sixteen megahertz in response to an applied direct-current control voltage with a variable range of three volts. The required accuracy of the control voltage is therefore 0.33 microvolts or better.

$(3 \text{ V} \times 100 \text{ Hz})/(16 \text{ MHz}) = 0.33 \text{ }\mu\text{V}$.

The variation in battery output voltage caused by switching eighteen LEDs on and off is on the order of one-tenth of a volt (0.1 V). When the LEDs are flashing, the battery output voltage has a rectangular waveform with a 0.1-V ripple. To obtain from this battery voltage a supply voltage accurate to within $0.33\mu\text{V}$, the telephone set requires a voltage regulating circuit with a ripple attenuation factor of about $1/300,000$.

$(33\mu\text{V})/(0.1 \text{ V}) = 1/300,000$

It would be extremely difficult to design a voltage-regulating circuit possessing this degree of regulation performance within the size and cost constraints of a wireless telephone set. With practical voltage-regulating circuits, when either the LEDs or the vibrator is switched on or off, the regulated supply voltage experiences a spike large enough to perturb the phase-locked loop significantly. The resulting carrier frequency disturbances can cause transmitting and receiving errors.

A further problem is that the current drawn by the LEDs and vibrator shortens the battery life of the telephone set.

SUMMARY OF THE INVENTION

It is accordingly an object of the present invention to prevent LED and vibrator switching from interfering with transmitting and receiving operations in a wireless telephone set.

A further object is to extend the battery life of a wireless telephone set.

The invented wireless telephone set performs digital communication, and employs LEDs for illumination. The LEDs are switched on and off responsive to user operations, and are also switched on and off to alert the user to incoming calls. A controller identifies idle periods in which the wireless telephone set is not performing digital communication. A LED control timing adjustment circuit synchronizes the switching of the LEDs with the idle periods, so that the LEDs are switched on and off only during the idle periods. Interference with transmitting and receiving operations is thereby avoided.

The invented wireless telephone set may also have a vibrator which can be switched on and off to alert the user to incoming calls. In this case, a vibrator control timing adjustment circuit synchronizes the switching of the vibrator with the idle periods, so that the vibrator is likewise switched on and off only during the idle periods. When incoming calls are announced by the vibrator, the switching of the LEDs is preferably masked, so that the LEDs remain off, thus extending the battery life by avoiding unnecessary current drain.

DETAILED DESCRIPTION OF THE INVENTION

An embodiment of the invention will be described with reference to the attached illustrative drawings. In the timing diagrams, control signals will be shown as active high, although of course this is not a restriction.

Figure 1:
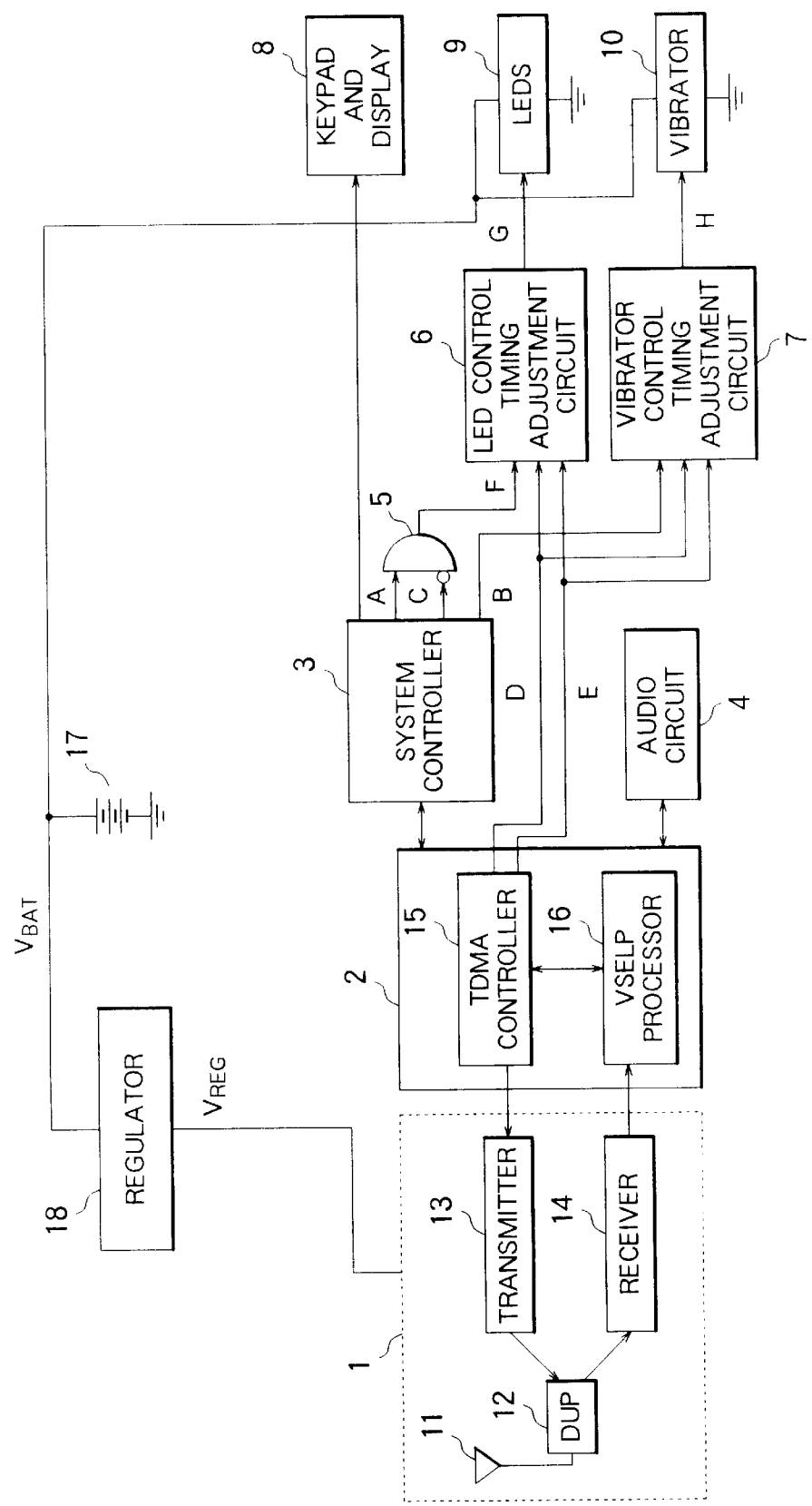
FIG. 1 is a block diagram of the invented wireless telephone set.

Referring to FIG. 1, the invented wireless telephone set comprises a radio-frequency section 1, a baseband signal-processing section 2, a system controller 3, an audio circuit 4, a logic gate 5, a LED control timing adjustment circuit 6, a vibrator control timing adjustment circuit 7, a keypad and display 8, a plurality of LEDs 9, and a vibrator 10. The radio-frequency section 1 comprises an antenna 11, an antenna duplexer (DUP) 12, a transmitter 13, and a receiver 14. The baseband signal-processing section 2 comprises a time-division multiple-access (TDMA) controller 15 and a vector-sum-excited linear-prediction (VSELP) processor 16.

Power is supplied by a battery 17 which provides a nominal output voltage $V_{BAT}$ of, for example, 3.6 V. This battery output voltage $V_{BAT}$ is supplied directly to the LEDs 9 and vibrator 10. A voltage regulator 18 receives $V_{BAT}$ and produces a lower but more accurately regulated voltage $V_{REG}$, which is supplied to the radio-frequency section 1, and to other circuits as necessary.

In the transmitting of voice signals, a pulse-code-modulation (PCM) coder-decoder (codec) in the audio circuit 4 converts an analog voice signal received from a microphone (not visible) to a digital signal, which is provided to the VSELP processor 16. The VSELP processor 16 compresses this digital signal and supplies the compressed data to the TDMA controller 15, which sends the data to the transmitter 13 as a baseband signal in appropriate time slots. The transmitter 13 uses this baseband signal to modulate a transmit carrier signal generated by a phase-locked loop (not visible). The resulting modulated transmit signal is sent to the antenna 11 via the antenna duplexer 12 and transmitted to a base station (also not visible).

In the receiving of voice signals, the receiver 14 receives a modulated radio-frequency signal from the base station via the antenna 11 and antenna duplexer 12, filters this signal to reject components outside the receiving frequency band, and demodulates the filtered signal, using a receive carrier signal generated by another phase-locked loop (not visible), to create a received baseband signal. The received baseband signal comprises compressed digital audio data, which the VSELP processor 16, operating in synchronization with timing signals supplied by the TDMA controller 15, expands to create a PCM audio signal. The PCM codec in the audio circuit 4 converts this PCM audio signal to an analog audio signal, which is reproduced through a loudspeaker (not visible).

A description of the well-known processes by which the VSELP processor 16 compresses and expands audio data will be omitted, to avoid obscuring the invention with irrelevant detail.

The system controller 3 communicates with the baseband signal-processing section 2 and keypad and display 8, and controls the operation of these and other parts of the wireless telephone set. Among the control signals output by the system controller 3 are a LED switching signal A, a vibrator switching signal B, and a LED masking signal C. These control signals are augmented by an idle-slot signal D and a synchronization status signal E output by the TDMA controller 15. Details of these signals will be given later.

The logic gate 5 receives the LED switching signal A and LED masking signal C, and outputs a masked LED switching signal F. The masked LED switching signal F is active when the LED switching signal A is active and the LED masking signal C is inactive. The masked LED switching signal F is inactive if either the LED switching signal A is inactive or the LED masking signal C is active. Thus when the LED masking signal C is inactive, the masked LED switching signal F is identical to the LED switching signal A, and when the LED masking signal C is active, the masked LED switching signal F is always inactive. The logic gate 5 is, for example, an AND gate with an inverter for inverting the LED masking signal C.

The LED control timing adjustment circuit 6 receives the masked LED switching signal F, idle-slot signal D, and synchronization status signal E, and outputs an adjusted LED switching signal G which turns the LEDs 9 on and off. Similarly, the vibrator control timing adjustment circuit 7 receives the vibrator switching signal B, idle-slot signal D, and synchronization status signal E, and outputs an adjusted vibrator switching signal H which turns the vibrator 10 on and off.

Figure 2:
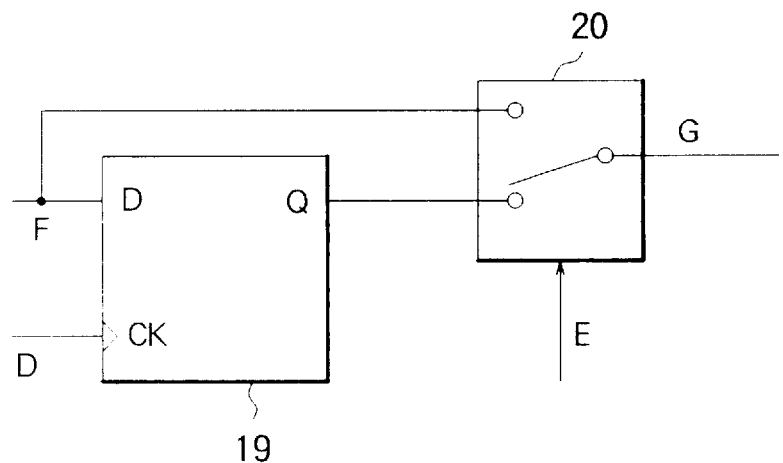
FIG. 2 is a more detailed block diagram of the LED control timing adjustment circuit in FIG. 1.

FIG. 2 illustrates the structure of the LED control timing adjustment circuit 6, which comprises an edge-triggered D-type flip-flop 19 and a selector 20.

An edge-triggered D-type flip-flop has a clock input terminal (CK), a data input terminal (D), and a data output terminal (Q). At the instant when the clock input (CK) changes from low to high, the data output (Q) is set equal to the data input (D). At other times, the data output (Q) is held constant, regardless of any changes in the data input (D). All transitions in the data output (Q) thus take place in synchronization with the low-to-high transitions of the clock input (CK). In the flip-flop 19 in the LED control timing adjustment circuit 6, the clock input signal is the idle-slot signal D, and the data input signal is the masked LED switching signal F.

The selector 20 receives the masked LED switching signal F at one input terminal and the output (Q) of the flip-flop 19 at another input terminal, selects one of these two input signals under control of the synchronization status signal E, and outputs the selected signal as the adjusted LED switching signal G. The output (Q) of the flip-flop 19 is selected when the synchronization status signal E is active. The masked LED switching signal F is selected when the synchronization status signal E is inactive.

Figure 3:
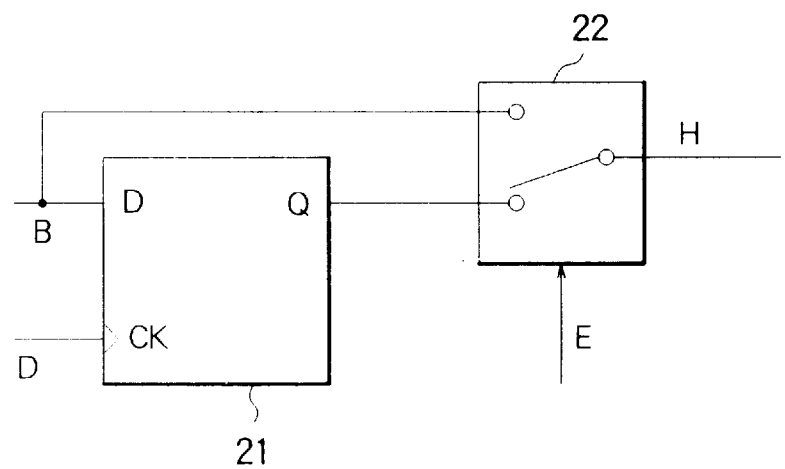
FIG. 3 is a more detailed block diagram of the vibrator control timing adjustment circuit in FIG. 1.

FIG. 3 illustrates the vibrator control timing adjustment circuit 7, which comprises an edge-triggered D-type flip-flop 21 and a selector 22. In structure and operation, this circuit 7 is completely analogous to the LED control timing adjustment circuit 6, except that the vibrator switching signal B, instead of the masked LED switching signal F, is input to the flip-flop 21 and selector 22, and the output of the selector 22 is the adjusted vibrator switching signal H.

Next, the operation of the invented wireless telephone set will be described with reference to FIGS. 4 to 8.

Figure 4:
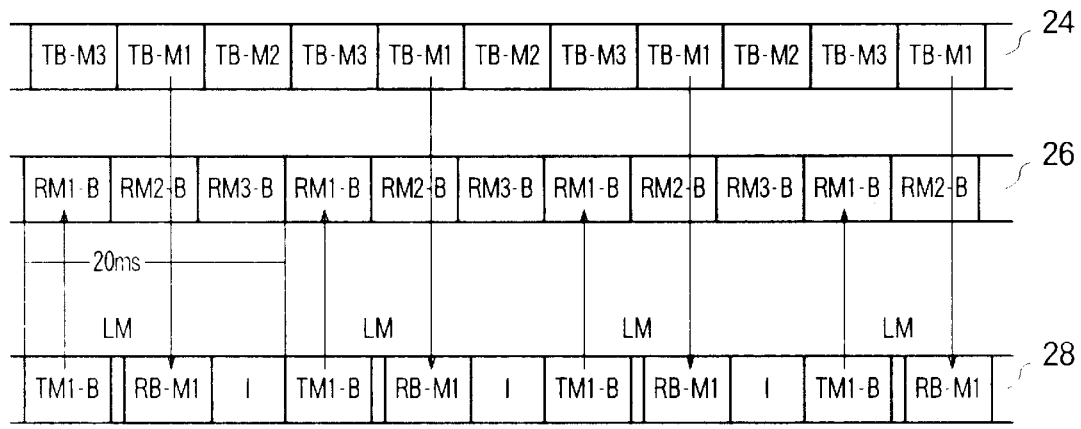
FIG. 4 is a timing diagram illustrating communication between the wireless telephone set and a base station.

FIG. 4 illustrates, as an example, the TDMA slot structure employed in the Japanese Digital Cellular System. In one frequency channel 24, a base station transmits data to three mobile stations (M1, M2, and M3) in time slots designated TB-M1, TB-M2, and TB-M3. These time slots repeat cyclically as shown, each group of three consecutive time slots being referred to as a frame. The frame length is twenty milliseconds (20 ms). In another frequency channel 26, the base station receives transmissions from the same three mobile stations in three time slots RM1-B, RM2-B, and RM3-B, which also repeat cyclically.

The first mobile station M1 transmits and receives alternately in a time-slot sequence 28 in which a transmitting time slot (TM1-B) is followed by a level-measurement time slot (LM), a receiving time slot (RB-M1), and an idle time slot (I). The transmitting and receiving time slots TM1-B and RB-M1 correspond to slots RM1-B and TB-M1 at the base station, as indicated by the arrows. The level-measurement slot (LM) is provided for antenna-switching diversity control, which is useful if the mobile station has two receiving antennas. The idle slot (I) is not used for either transmitting or receiving.

Figure 5:
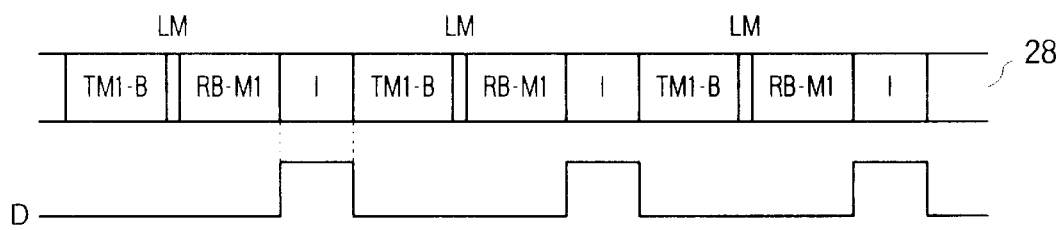
FIG. 5 is a timing diagram illustrating a control signal generated in the wireless telephone set.

For the time-slot scheme shown in FIG. 4, if the invented wireless telephone set is mobile station M1, the idle-slot signal D has the waveform shown in FIG. 5. The idle-slot signal D identifies idle time slots (I) by going to the active (high) level during idle time slots (I), and to the inactive (low) level during transmitting time slots (TM1-B), receiving time slots (RB-M1), and level-measurement time slots (LM) in the time-slot sequence 28. The idle-slot signal D can become active only when the wireless telephone set is synchronized with a base station.

Figure 6:
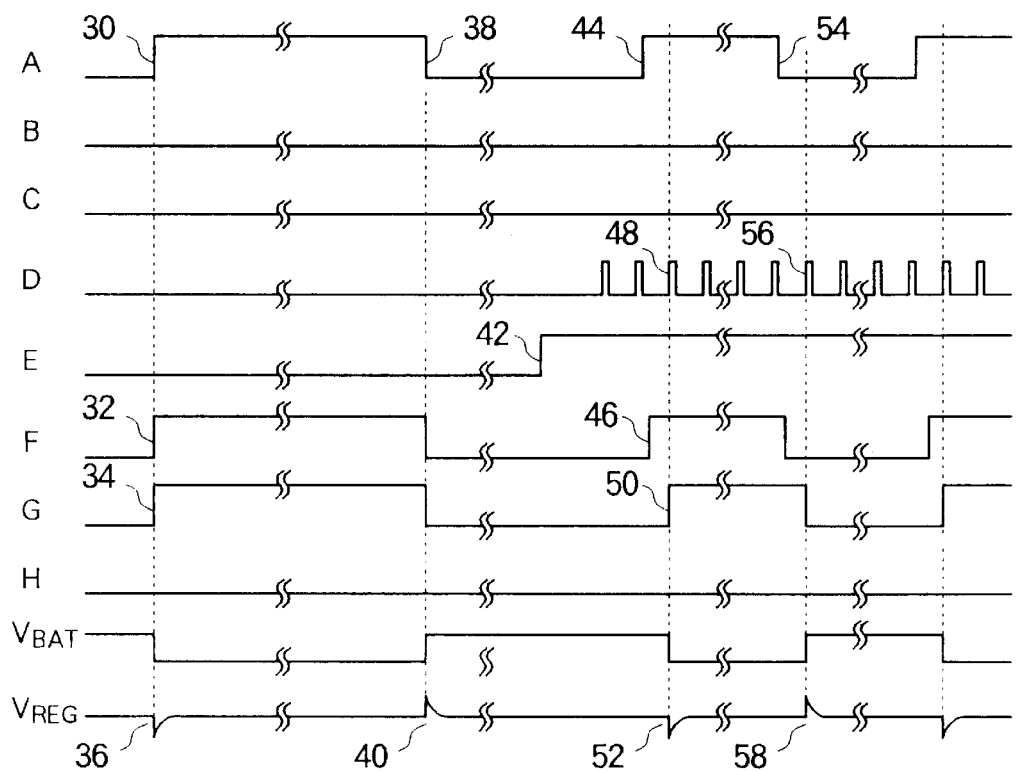
FIG. 6 is a timing diagram illustrating control signals in the synchronized and unsynchronized states.

Referring now to FIG. 6, suppose that the wireless telephone set is not within range of any base station and is therefore not synchronized. During this unsynchronized period, the TDMA controller 15 does not generate any time slots, the synchronization status signal E is inactive (low), the idle-slot signal D stays inactive (low), and the other control signals A, B, C, F, G, and H described above are all normally inactive (low), as shown at the left edge of FIG. 6.

If the user presses one of the pushbuttons, to store a number in the speed-dialing memory of the telephone set, for example, the system controller 3 activates the LED switching signal A, causing a rising transition 30. Since the LED masking signal C is inactive, the masked LED switching signal F is identical to the LED switching signal A and experiences a simultaneous rising transition 32. Since the synchronization status signal E is inactive, the selector 18 selects the masked LED switching signal F as the adjusted LED switching signal G. The adjusted LED switching signal G therefore responds to the rising transition 32 with a simultaneous rising transition 34, which turns on the LEDs 9.

The current drawn by the LEDs 9 depresses the battery output voltage $V_{BAT}$ slightly. The drop of $V_{BAT}$ causes a momentary downward spike 36 in the regulated voltage $V_{REG}$. Since the wireless telephone set is not communicating with a base station, however, this voltage spike 36 does not create any transmitting or receiving problems.

After a certain time, the system controller 3 deactivates the LED switching signal A, causing a falling transition 38 of this signal A. The LED masking signal C and synchronization status signal E are still inactive, so the masked LED switching signal F and adjusted LED switching signal G respond by going low simultaneously with this falling transition 38, turning off the LEDs 9. The battery output voltage $V_{BAT}$ rises to the normal level again, the rise causing a momentary upward spike 40 in the regulated voltage $V_{REG}$, but since the wireless telephone set is still not communicating with a base station, no problems occur.

Thus the LEDs 9 can be switched on and off at arbitrary times during unsynchronized periods. The resulting spikes in the regulated voltage $V_{REG}$ do not disrupt communication, because digital communication is not taking place.

Suppose next that the wireless telephone set is brought within range of a base station, detects a synchronization burst transmitted by the base station, and thereby establishes synchronization with the base station. The synchronization operations are carried out by the TDMA controller 15, under the direction of the system controller 3. When synchronization is achieved, the TDMA controller 15 activates the synchronization status signal E, causing the rising transition 42 shown in FIG. 6.

During the initial communication period, before the base station has assigned specific transmitting and receiving frequencies or time slots to the wireless telephone set, the TDMA controller 15 holds the idle-slot signal D in the inactive state, thus preventing any changes in the outputs of flip-flops 19 and 21. These outputs are selected by the selectors 20 and 22 as the adjusted LED switching signal G and adjusted vibrator switching signal H, which are therefore also prevented from changing. This arrangement assures that initial communication with the base station is not disrupted by voltage fluctuations caused by switching of the LEDs 9 and vibrator 9.

Once the base station has assigned frequencies and time slots, the phase-locked loops in the radio-frequency section 1 begin generating transmit and receive carrier signals at the assigned frequencies, and the TDMA controller 15 starts generating time slots and begins output of the idle-slot signal D. The wireless telephone set is now ready to originate and receive calls.

If the wireless telephone set has not been placed in the vibrator call mode, when an incoming call is received, the system controller 3 activates the LED switching signal A, causing a rising transition 44 of this signal, but does not activate the vibrator switching signal B or LED masking signal C. Since the LED masking signal C is inactive, the logic gate 5 generates a rising transition 46 of the masked LED switching signal F.

In the LED control timing adjustment circuit 6, the output of the flip-flop 19 goes high at the next rising transition 48 of the idle-slot signal D, which occurs at the beginning of the next idle time slot. Since the synchronization status signal E is active, the selector 20 selects the output of the flip-flop 19 as the adjusted LED switching signal G, causing a rising transition 50 of the adjusted LED switching signal G to take place in response to the rising transition 46 of the masked LED switching signal F, but in synchronization with the rising transition 48 of the idle-slot signal D.

The LEDs 9 now turn on, depressing the battery output voltage $V_{BAT}$ and causing a momentary downward spike 52 in the regulated voltage $V_{REG}$, but since this spike 52 occurs at the beginning of an idle time slot, it does not interfere with transmitting or receiving. The phase-locked loops in the radio-frequency section 1 have ample time to recover from the resulting frequency perturbation before the beginning of the next transmitting time slot and the next receiving time slot.

After a certain time, such as one second, for example, the system controller 3 deactivates the LED switching signal A, causing a falling transition 54. The masked LED switching signal F goes low immediately, and the adjusted LED switching signal G responds by going low in synchronization with the next rising transition 56 of the idle-slot signal D. The LEDs 9 turn off at the fall of the adjusted LED switching signal G, restoring the battery output voltage $V_{BAT}$ to the normal level and causing a momentary upward spike 58 in the regulated voltage $V_{REG}$. This spike 58 also occurs at the beginning of an idle time slot, in synchronization with the rising transition 56 of the idle-slot signal D, and does not interfere with transmitting or receiving.

Until the user presses a pushbutton to answer the call, the system controller 3 continues to activate and deactivate the LED switching signal A, thereby flashing the LEDs 9 on and off at, for example, one-second intervals. The resulting spikes in the regulated voltage $V_{REG}$ all occur at the beginning of idle time slots, and do not cause transmitting or receiving problems.

Figure 7:
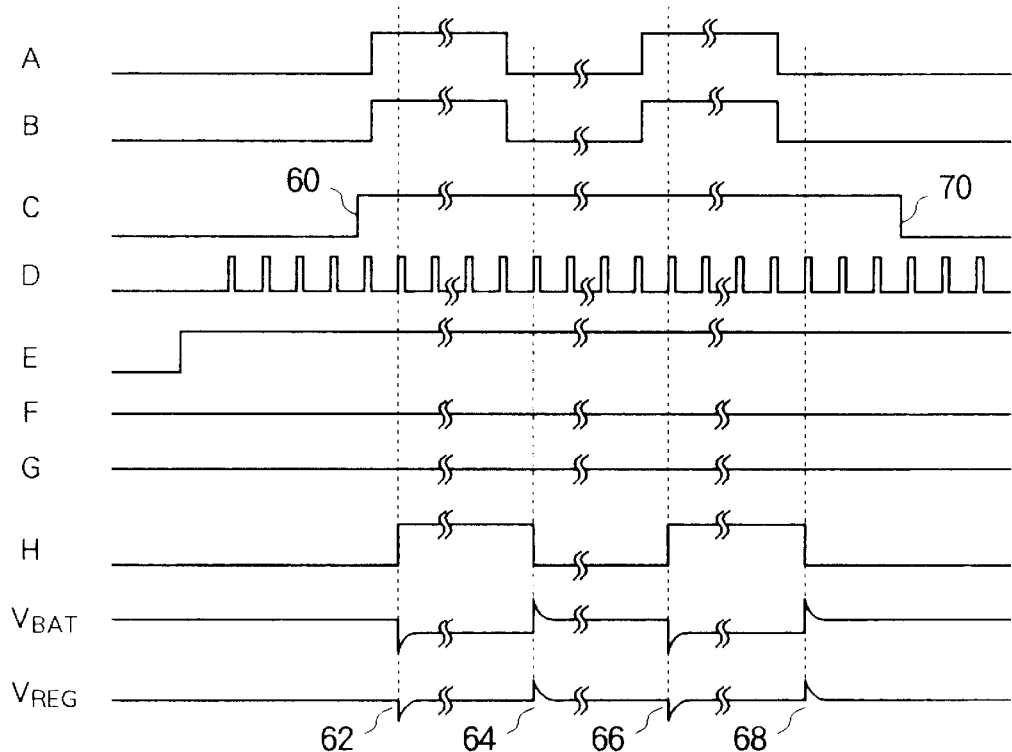
FIG. 7 is a timing diagram illustrating the operation of the vibrator.

Suppose now that at some later time, the wireless telephone set is set to the vibrator call mode and, after synchronizing with a base station, receives a call in this mode. Suppose further that LED flashing has not been disabled by the user. Referring to FIG. 7, when a call arrives, the system controller 3 first activates the LED masking signal C, causing a rising transition 60, then begins activating and deactivating the LED switching signal A and vibrator switching signal B simultaneously at, for example, one-second intervals.

Since the LED masking signal C is active, the masked LED switching signal F output by the logic gate 5 remains inactive despite the activity of the LED switching signal A. The adjusted LED switching signal G therefore also remains inactive, and the LEDs 9 do not turn on, even though the user has not disabled LED flashing.

In the vibrator control timing adjustment circuit 7, the output of the flip-flop 21 goes high and low in response to rising and falling transitions of the vibrator switching signal B, but the transitions in the flip-flop output occur in synchronization with rising transitions of the idle-slot signal D. Since the synchronization status signal E is active, the selector 22 selects the output of the flip-flop 21 as the adjusted vibrator switching signal H. The adjusted vibrator switching signal H thus goes high and low, switching the motor in the vibrator 10 on and off, at instants synchronized with rising transitions of the idle-slot signal D.

When switched on by a rising transition of the adjusted vibrator switching signal H, the vibrator motor draws an initially large transient current, then a smaller steady-state current. The battery output voltage $V_{BAT}$ therefore dips by a comparatively large initial amount, then recovers part-way toward the normal level. Similar fluctuations in $V_{BAT}$ occur when the vibrator motor is switched off by falling transitions of the adjusted vibrator switching signal H. These battery voltage fluctuations cause corresponding spikes 62, 64, 66, and 68 in the regulated voltage $V_{REG}$, but since the spikes occur at the beginnings of idle time slots, they do not interfere with transmitting or receiving.

If the LEDs 9 and vibrator 10 were turned on and off simultaneously as in the prior art, the combination of the LED current drain and the large transient current drawn by the vibrator motor at the moment of switching might excessively tax the capabilities of the voltage regulator 18, but since the LEDs 9 are automatically disabled by the LED masking signal C while the vibrator 10 is operating, this problem does not occur. Moreover, since the LEDs are not switched on, overall current drain is reduced, thereby extending the life of the battery 17.

The automatic disabling of the LEDs 9 while the vibrator 10 is in operation is not a significant inconvenience to the user, because when the vibrator call mode is employed, the wireless telephone set is normally placed in the user's pocket, where the LEDs 9 are out of sight anyway.

When the user answers the vibrator call, the system controller 3 halts the output of active LED switching signal A and vibrator switching signal B, then deactivates the LED masking signal C, causing the falling transition 70. After this transition 70, the LEDs 9 can be switched on in response to the press of a pushbutton by the user.

By limiting disruptions of the regulated voltage $V_{REG}$ to idle time slots, the invention improves the reliability of communication between the wireless telephone set and base station, particularly during the critical set-up period of an incoming call, in both the normal call mode and the vibrator call mode. During all transmitting and receiving time slots, the phase-locked loops in the radio-frequency section 1 generate stable carrier signals, undisturbed by supply voltage fluctuations.

The invention is not limited to use with the specific time-slot scheme shown in FIG. 4, but can be advantageously employed in any cellular system in which transmitting and receiving periods are interspersed with idle periods. For example, the invention can be practiced in code-division multiple-access (CDMA) cellular systems having such idle periods.

The invented wireless telephone set may also be equipped to transmit and receive not only digital signals but also analog signals, such as those employed in the North American Advanced Mobile Phone System (AMPS). Suitable analog signal-processing circuits must then be provided in the baseband signal-processing section 2. In this case, when the wireless telephone set is in communication with an analog base station, while either waiting for or engaged in an analog telephone call, no time slots are generated and the idle-slot signal D and synchronization status signal E remain inactive (low). Differing from the carrier signals employed in digital communications, the carrier signals employed in analog communication have less stringent frequency accuracy requirements, so the voltage fluctuations caused by switching the LEDs 9 and vibrator 10 on and off do not have a significant effect on analog communications.

When the wireless telephone set is equipped only for digital communication, no calls can be received until synchronization with a base station is acquired, so the vibrator 10 never operates in the unsynchronized state. The vibrator control timing adjustment circuit 7 can accordingly be simplified by eliminating the selector 22 and using the output of the flip-flop 21 directly as the adjusted vibrator switching signal H.

If the wireless telephone set does not have a vibrator 10, the logic gate 5 and vibrator control timing adjustment circuit 7 can be eliminated, and the system controller 3 need not output a LED masking signal C. In place of the masked LED switching signal F, the LED switching signal A can then be supplied directly to the LED control timing adjustment circuit 6.

Those skilled in the art will recognize that further variations are possible within the scope claimed below.

What is claimed is:

1. A method of controlling a wireless telephone set that performs digital communication with a base station in a cellular telephone system and has light-emitting diodes for illumination, comprising the steps of:

switching said light-emitting diodes on and off responsive to operations by a user of said wireless telephone set;

switching said light-emitting diodes on and off to alert said user to incoming calls;

identifying idle periods in which said wireless telephone set is not performing digital communication with said base station; and synchronizing the switching of said light-emitting diodes with said idle periods, so that said light-emitting diodes are switched on and off only during said idle periods.

2. The method of claim 1, wherein:

said wireless telephone set performs said digital communication by a time-division multiple-access system having transmitting time slots, receiving time slots, and idle time slots;

said idle periods comprise said idle time slots;

said step of identifying comprises identifying beginnings of said idle time slots; and said step of synchronizing comprises synchronizing the switching of said light-emitting diodes with the beginnings of said idle time slots.

3. The method of claim 2, wherein:
said idle periods also comprise unsynchronized periods in which said wireless telephone set is not synchronized with said base station and does not communicate according to said transmitting time slots, receiving time slots, and idle time slots; and
said step of synchronizing comprises switching said light-emitting diodes on and off at arbitrary times within said unsynchronized periods, responsive to said operations by said user.

4. The method of claim 1, wherein said wireless telephone set also has a vibrator, comprising the further steps of:
switching said vibrator on and off to alert said user to incoming calls; and
synchronizing the switching of said vibrator with said idle periods, so that said vibrator is switched on and off only during said idle periods.

5. The method of claim 4, wherein:
said wireless telephone set performs said digital communication by a time-division multiple-access system having transmitting time slots, receiving time slots, and idle time slots;
said idle periods comprise said idle time slots;
said step of identifying comprises identifying beginnings of said idle time slots; and
said step of synchronizing the switching of said vibrator comprises synchronizing the switching of said vibrator with the beginnings of said idle time slots.

6. The method of claim 4, comprising the further step of:
masking the switching of said light-emitting diodes while said vibrator is being used to alert said user to an incoming call, so that said light-emitting diodes remain off and are not used to alert said user to said incoming call.

7. A wireless telephone set for communicating with a base station in a cellular telephone system, said wireless telephone set having pushbuttons, a display, light-emitting diodes for illuminating said pushbuttons and said display, and a vibrator for alerting a user to incoming calls, comprising:
a first controller generating a first control signal for indicating when said light-emitting diodes are to be switched on and off, a second control signal indicating when said vibrator is to be switched on and off, and a third control signal indicating an interval of time during which said vibrator is repeatedly switched on and off by said second control signal;
a second controller generating a fourth control signal indicating whether said wireless telephone set is synchronized with said base station, and a fifth control signal identifying idle periods when said wireless telephone set is synchronized with said base station but is neither transmitting a signal to nor receiving a signal from said base station;
a logic circuit coupled to said first controller for generating a sixth control signal that is identical to said first control signal when said third control signal does not indicate said interval of time, said sixth control signal being inactive when said third control signal indicates said interval of time;
a first timing adjustment circuit coupled to said first controller and said second controller, for combining said fourth control signal, said fifth control signal, and said sixth control signal to generate a seventh control signal that switches said light-emitting diodes on and off; and a second timing adjustment circuit coupled to said first controller and said second controller, for combining said second control signal, said fourth control signal, and said fifth control signal to generate an eighth control signal that switches said vibrator on and off; wherein when said fourth control signal indicates that said wireless telephone set is not synchronized with said base station, said seventh control signal responds to and is synchronized with said sixth control signal, and said eighth control signal responds to and is synchronized with said second control signal; and when said fourth control signal indicates that said wireless telephone set is synchronized with said base station, said seventh control signal responds to said sixth control signal in synchronization with said fifth control signal, so that transitions of said seventh control signal occur only during said idle periods, and said eighth control signal responds to said second control signal in synchronization with said fifth control signal, so that transitions of said eighth control signal occur only during said idle periods.

8. The wireless telephone set of claim 7, wherein said first timing adjustment circuit comprises:
a first flip-flop receiving said sixth control signal as a data input signal and said fifth control signal as a clock input signal and generating a first flip-flop output signal; and
a first selector coupled to said first flip-flop, for selecting one signal among said sixth control signal and said first flip-flop output signal, responsive to said fourth control signal, and supplying the signal thus selected as said seventh control signal.

9. The wireless telephone set of claim 7, wherein said second timing adjustment circuit comprises:
a second flip-flop receiving said second control signal as a data input signal and said fifth control signal as a clock input signal and generating a second flip-flop output signal; and
a second selector coupled to said second flip-flop, for selecting one signal among said second control signal and said second flip-flop output signal, responsive to said fourth control signal, and supplying the signal thus selected as said eighth control signal.

10. The wireless telephone set of claim 7, wherein:
said wireless telephone set communicates with said base station by a time-division multiple-access system having transmitting time slots, receiving time slots, and idle time slots;
said idle periods are said idle time slots; and
said timing adjustment circuit synchronizes said fourth control signal with the beginnings of said idle time slots, as identified by said third control signal.

11. A wireless telephone set for communicating with a base station in a cellular telephone system, said wireless telephone set having pushbuttons, a display, and light-emitting diodes for illuminating said pushbuttons and said display, comprising:
a first controller generating a first control signal indicating when said light-emitting diodes are to be switched on and off;
a second controller generating a second control signal indicating whether said wireless telephone set is synchronized with said base station, and a third control signal identifying idle periods when said wireless telephone set is synchronized with said base station but is neither transmitting a signal to nor receiving a signal from said base station; and a timing adjustment circuit coupled to said first controller and said second controller, for combining said first control signal, said second control signal, and said third control signal to generate a fourth control signal that switches said light-emitting diodes on and off; wherein when said second control signal indicates that said wireless telephone set is not synchronized with said base station, said fourth control signal responds to and is synchronized with said first control signal; and when said second control signal indicates that said wireless telephone set is synchronized with said base station, said fourth control signal responds to said first control signal in synchronization with said third control signal, so that transitions of said fourth control signal occur only during said idle periods.

12. The wireless telephone set of claim 11, wherein said timing adjustment circuit comprises:

a flip-flop receiving said first control signal as a data input signal and said third control signal as a clock input signal and generating a flip-flop output signal; and a selector coupled to said flip-flop, for selecting one signal among said first control signal and said flip-flop output signal, responsive to said second control signal, and supplying the signal thus selected as said fourth control signal.

13. The wireless telephone set of claim 11, wherein:

said wireless telephone set communicates with said base station by a time-division multiple-access system having transmitting time slots, receiving time slots, and idle time slots;

said idle periods comprise said idle time slots; and said timing adjustment circuit synchronizes said fourth control signal with the beginnings of said idle time slots, as identified by said third control signal.

14. A wireless telephone set for communicating with a base station in a cellular telephone system, said wireless telephone set having a vibrator for alerting a user to incoming calls, comprising:

a first controller generating a first control signal indicating when said vibrator should be switched on and off;

a second controller generating a second control signal indicating whether said wireless telephone set is synchronized with said base station, and a third control signal identifying idle periods when said wireless telephone set is synchronized with said base station but is neither transmitting a signal to nor receiving a signal from said base station; and a timing adjustment circuit coupled to said first controller and said second controller, for combining said first control signal, said second control signal, and said third control signal to generate a fourth control signal that switches said vibrator on and off; wherein when said second control signal indicates that said wireless telephone set is not synchronized with said base station, said fourth control signal responds to and is synchronized with said first control signal; and when said second control signal indicates that said wireless telephone set is synchronized with said base station, said fourth control signal responds to said first control signal in synchronization with said third control signal, so that transitions of said fourth control signal occur only during said idle periods.

15. The wireless telephone set of claim 14, wherein said timing adjustment circuit comprises:

a flip-flop receiving said first control signal as a data input signal and said third control signal as a clock input signal and generating a flip-flop output signal; and a selector coupled to said flip-flop, for selecting one signal among said first control signal and said flip-flop output signal, responsive to said second control signal, and supplying the signal thus selected as said fourth control signal.

16. The wireless telephone set of claim 14, wherein:

said wireless telephone set communicates with said base station by a time-division multiple-access system having transmitting time slots, receiving time slots, and idle time slots;

said idle periods comprise said idle time slots; and said timing adjustment circuit synchronizes said fourth control signal with the beginnings of said idle time slots, as identified by said third control signal.

* * * * *